United States Patent
Inoue

(10) Patent No.: US 7,324,238 B2
(45) Date of Patent: Jan. 29, 2008

(54) IMAGE PROCESSING APPARATUS, METHOD OF SETTING TONAL GRADATION CONVERSION CHARACTERISTICS, AND COMPUTER PROGRAM

(75) Inventor: Hitoshi Inoue, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 10/702,170

(22) Filed: Nov. 4, 2003

(65) Prior Publication Data

US 2004/0105596 A1 Jun. 3, 2004

(30) Foreign Application Priority Data

Nov. 28, 2002 (JP) .............................. 2002-346194

(51) Int. Cl.
*H04N 1/60* (2006.01)
*G06K 9/40* (2006.01)

(52) U.S. Cl. .................. 358/1.9; 358/1.9; 358/2.1; 358/3.1; 358/521; 358/3.01; 358/3.28; 382/274; 382/167; 382/170; 345/89

(58) Field of Classification Search ................ 358/1.9, 358/521, 2.1, 3.1, 3.01, 3.28; 382/274, 167, 382/170; 345/617, 601, 672, 614, 634, 89, 345/581; 348/236, 234

See application file for complete search history.

(56) References Cited

U.S. PATENT DOCUMENTS

| 4,760,447 | A | | 7/1988 | Szabo |
| 5,369,499 | A | * | 11/1994 | Yip ............................ 358/406 |
| 5,381,349 | A | | 1/1995 | Winter |
| 5,461,462 | A | * | 10/1995 | Nakane et al. ................ 399/15 |
| 5,483,259 | A | | 1/1996 | Sachs |
| 5,926,617 | A | | 7/1999 | Hibino |
| 6,005,636 | A | | 12/1999 | Westerman |
| 6,044,204 | A | * | 3/2000 | Takamatsu et al. .......... 358/1.9 |
| 6,693,642 | B1 | | 2/2004 | Ogawa |
| 6,993,200 | B2 | * | 1/2006 | Tastl et al. .................. 382/240 |

FOREIGN PATENT DOCUMENTS

| EP | 0961260 A | 1/1999 |
| JP | 2001-34255 | 2/2001 |

* cited by examiner

*Primary Examiner*—King Y. Poon
*Assistant Examiner*—S. Kau
(74) *Attorney, Agent, or Firm*—Canon U.S.A. Inc., I.P. Division

(57) ABSTRACT

Four test patterns are concurrently displayed on a display of a computer. The test patterns include respective backgrounds and contrast areas. The test patterns, different from each other in pixel value, have identically shaped contrast areas. The contrast between the background and the contrast area remains unchanged from test pattern to test pattern. The contrast areas are adjusted in contrast with the pixel value of the background fixed until the test patterns look the same.

6 Claims, 16 Drawing Sheets

FIG. 7A  TEST PATTERN 21
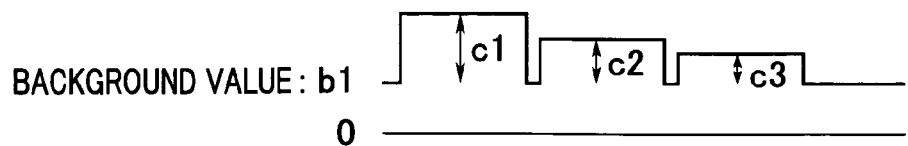
FIG. 7B  TEST PATTERN 22
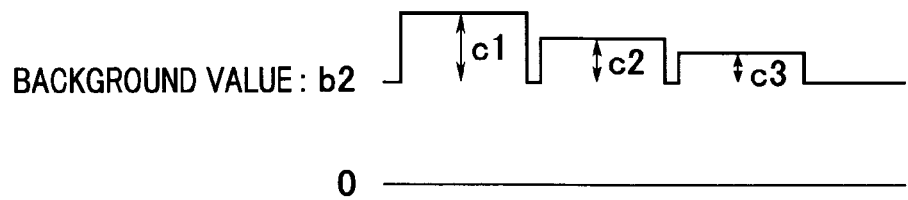
FIG. 7C  TEST PATTERN 23
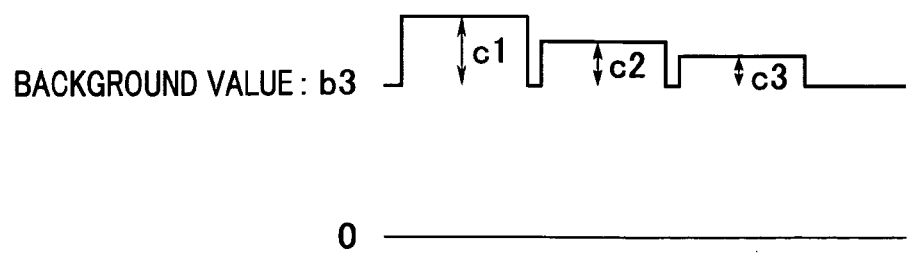
FIG. 7D  TEST PATTERN 24
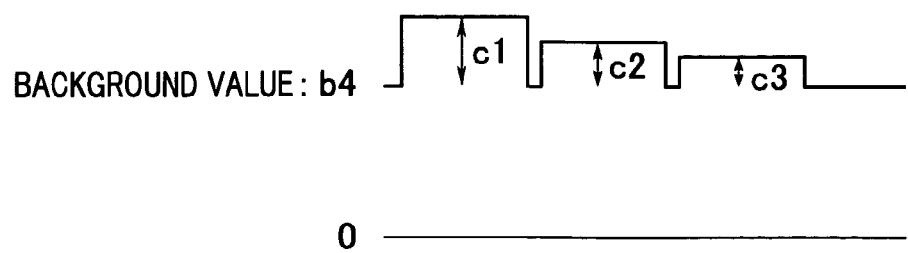

IMAGE PROCESSING APPARATUS, METHOD OF SETTING TONAL GRADATION CONVERSION CHARACTERISTICS, AND COMPUTER PROGRAM

BACKGROUND OF THE INVENTION

1. Field of the Invention

The present invention relates to a tonal gradation conversion of an image to be displayed on a display.

2. Description of the Related Art

Tonal gradation conversion is one of basic functions of an image display apparatus. The objective of the image display apparatus is to exactly convey image information to a viewer. The tonal gradation characteristics of the image display apparatus, namely, a relationship between an input signal intensity "X" and an illumination "L", is referred to as a gamma value "γ", and expressed in the following equation 1.

$$L = X^\gamma \quad \text{[Equation 1]}$$

According to studies, sensitivity of the human eye to luminance is roughly expressed as in equation 2, where "S" represents human eye sensitivity and "L" represents the intensity of light reaching the human eyes, and "a" is an index ranging from 0.3 to 0.4.

$$S = L^\alpha \quad \text{[Equation 2]}$$

In accordance with equations 1 and 2, the input signal intensity X and the sensitivity S are substantially proportional to each other. The gamma value γ of the display apparatus is defined in this way.

In a display apparatus, a gamma value γ of 1.8 is typically used so that printing results and the output of the display apparatus appear the same to the human eyes.

Standardization of the display apparatuses has been conventionally performed by measuring luminance characteristics of the display and then by adjusting the gamma value γ. The standardization allows displayed images to remain substantially the same from viewer to viewer without regard to difference between display apparatuses.

However, the object of the display apparatus is to convey exact image information to a viewer rather than standardization information of the display apparatus itself. Further, each viewer has his or her own characteristics, and the value of a in equation 2 is not always the same for all individuals. The characteristics expressed by equation 2 are not always equally applicable to all individuals.

Despite standardization, content of recognizable image information stored in the computer potentially appears different from viewer to viewer if the display apparatus is adjusted based on the standardization alone because such standardization does not take into consideration the characteristics of each viewer.

In particular, this effect is pronounced in the field of medical image display apparatuses and doctors can have difficulty learning the location of an injury and illness on a medical image.

Japanese Patent-Laid Open No. 2001-34255 discloses a method and an apparatus for selectively using one from a plurality tonal gradation conversion tables to compensate for a degradation in luminance of a display device. One disadvantage of this reference is that it fails to select the table based on the vision characteristics of the viewer.

SUMMARY OF THE INVENTION

It is an object of the present invention to provide an apparatus that allows tonal gradation characteristics to be appropriately set on an image displayed on a display by taking into consideration vision characteristics of a viewer.

According to the present invention, the foregoing object is attained by providing an apparatus for processing an image as shown in FIG. 18, which includes an image generating unit 51 for generating and/or storing a plurality of types of pattern images, a tonal gradation conversion unit 52 for converting image data, received from the image generating unit 51, into an output signal using a lookup table 53, a display unit 54 for converting the output signal from the tonal gradation conversion unit 52 into a luminance value to be displayed thereon, and an input unit 55 for inputting information relating to a pixel value of a background area of the pattern image and/or an amount of change in contrast of the pattern image.

The apparatus also includes a control unit 56, which performs control for invoking a pattern image from the image generating unit 51 in response to the input information of the input unit 55 and for presenting the pattern image on the display unit 54 through the tonal gradation transportation unit 52, or performs control for invoking the pattern image from the image generating unit 51 in response to the input information of the input unit 55 and for displaying the pattern image with the lookup table 53 modified, a selecting unit 57 for selecting the pattern image presented on the display unit 54 by inputting a confirmation signal, and a calculating unit 58 for calculating the lookup table 53 from the pixel value of the background of the selected pattern image and the contrast of the selected pattern.

Further, the foregoing object is also attained by providing a method of setting tonal gradation conversion characteristics applied to an image in an image processing apparatus that processes the image displayed on a display unit. The method includes an input step for inputting a position in the image displayed on the display unit and a contrast at the position with the position and the contrast associated with each other, a modification step for modifying the contrast of the displayed image in accordance with the input information input in the input step, and a setting step for setting tonal gradation conversion characteristics on the image displayed on the display unit in accordance with the input information.

Other objects, features and advantages of the present invention will be apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIGS. 7A-7D are graphs corresponding to various test patterns shown in FIG. 2.

DESCRIPTION OF THE PREFERRED EMBODIMENTS

Preferred embodiments of the present invention will be described in detail in accordance with the accompanying drawings.

First Embodiment

Figure 1:
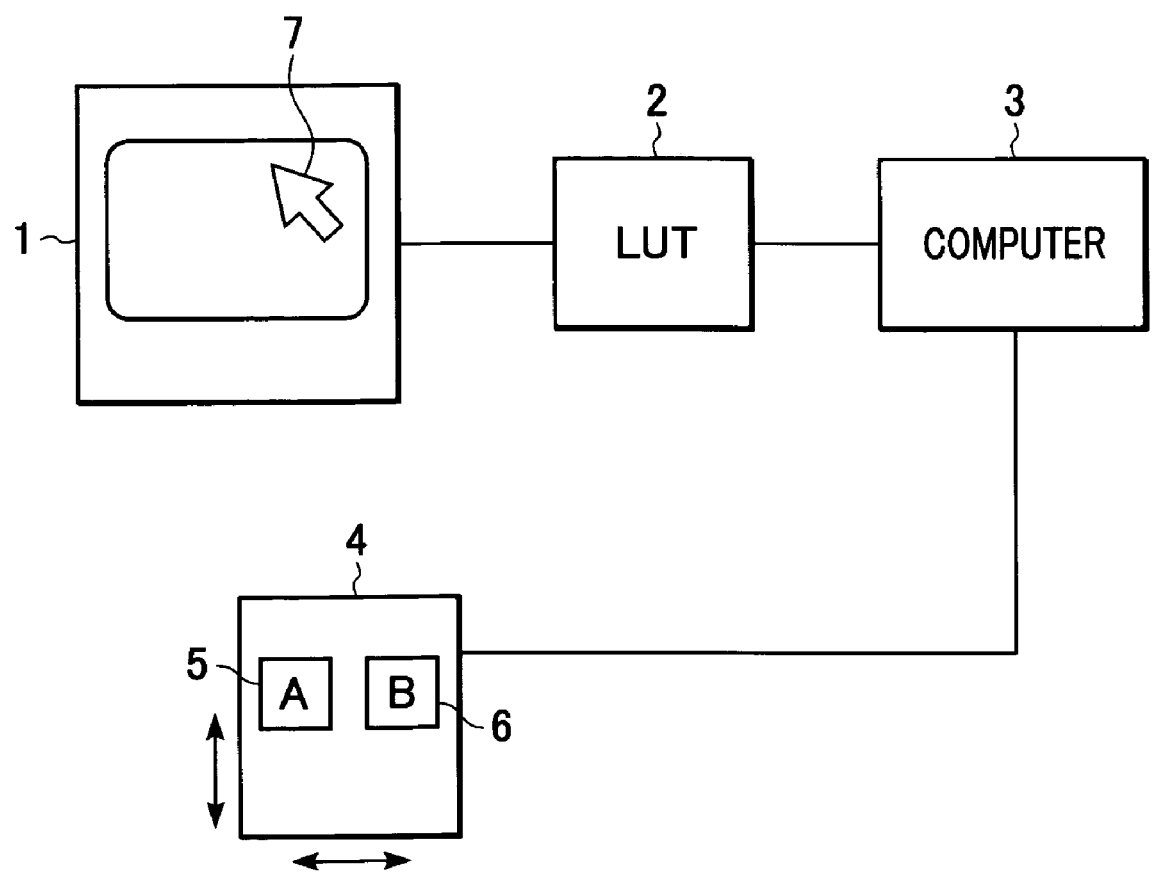
FIG. 1 is a diagram illustrating an image display apparatus in accordance with one embodiment of the present invention.

A first embodiment of the present invention will now be described. FIG. 1 is a block diagram illustrating an image display apparatus of the first embodiment of the present invention.

The image display apparatus includes a computer 3 for producing image data, a lookup table LUT (also referred to as a tonal gradation conversion table or a tonal gradation conversion function) 2 for converting the image data (pixel value) to another value, and a display 1 for converting an output signal from the LUT 2 into a light luminance value to display the output signal thereon. In the first embodiment, the computer 3 and the LUT 2 constitute image data generating means. A position indicator (a position designator) 4 for conveying a position on the computer display 1 to the computer 3 is connected to the computer 3. The position indicator 4 has two buttons (contrast modification command input means) 5 and 6 for respectively increasing and reducing image contrast.

The computer display 1 includes, but not limited to one of a cathode-ray tube (CRT) and a liquid-crystal display. The output signal of the computer 3 and the output signal of the LUT 2 are digital signals, for example.

The LUT 2 is arranged external to the computer 3 as shown in FIG. 1. Alternatively, the LUT 2 may be integrated with the computer 3. Further, the LUT 2 may be designed to operate under the control of an internal program of the computer 3.

The position indicator 4 includes, but not limited to a mouse, for example. By moving the position indicator 4 on a desktop, a cursor (pointer) 7 moves on the computer display 1. Referring to a message presented by the computer 3 in response to the position of the mouse, the operator learns what commands the computer 3 accepts. The user can operate the buttons 5 and 6 while moving the position indicator 4 at the same time. However, the buttons 5 and 6 are not necessarily mounted on the position indicator 4. They may be arranged external to the position indicator 4. If the position indicator 4 is a mouse, the button 5 is a left click, and the button 6 is a right click.

The image display apparatus of the first embodiment is designed to allow parameters such as contrast to be optimized for the operator before the operator actually examines obtained images such as medical images.

Described next are a method for adjusting the parameters and structures of the LUT 2 and the computer 3.

Figure 2:
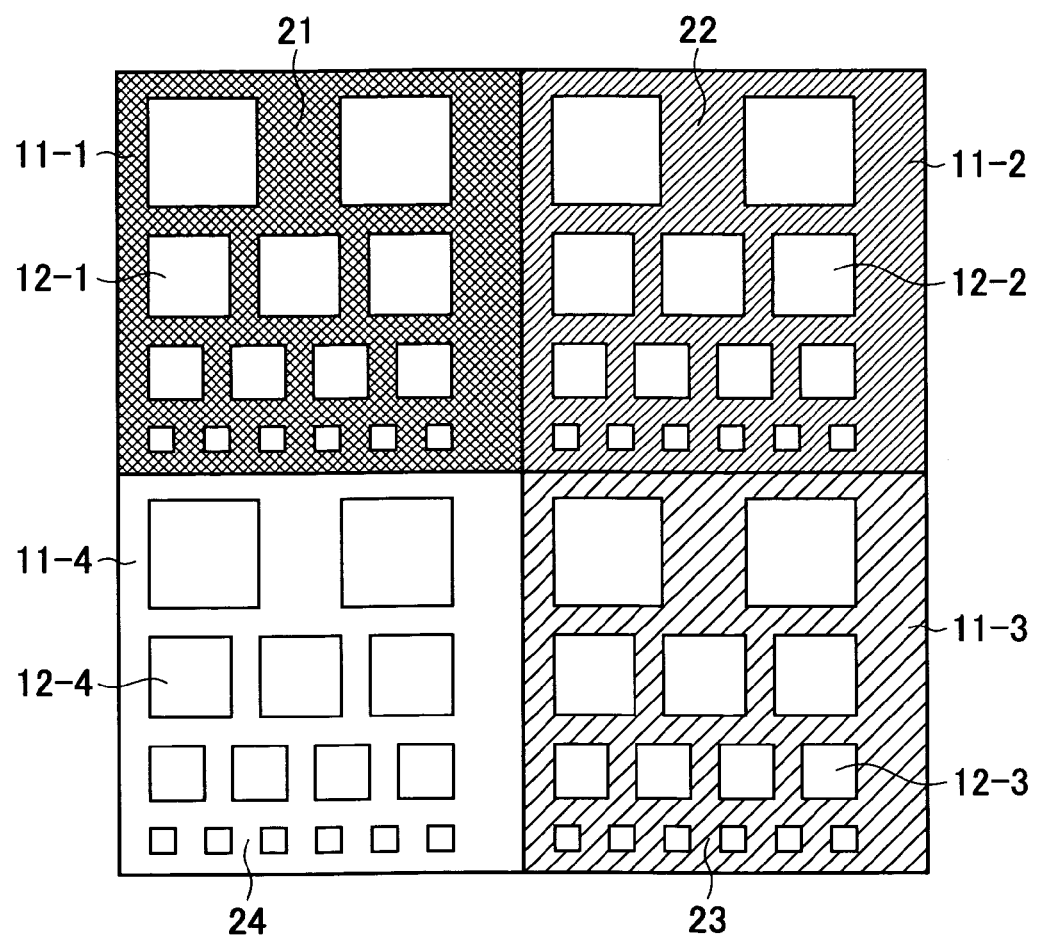
FIG. 2 illustrates a test pattern produced by a computer.

FIG. 2 illustrates a test pattern generated by the computer 3. The computer 3 produces a test pattern, which has adjustable parameters such as contrast. That is, contrast can be adjusted by referencing the test pattern.

As shown, the computer 3 generates and concurrently displays four test patterns 21 through 24 on the computer display 1. The test patterns 21 through 24 respectively include backgrounds 11-1 through 11-4 and contrast areas 12-1 through 12-4. The test patterns, different from each other in pixel value, have identically shaped contrast areas. The contrast between the background and the contrast area remains unchanged from test pattern to test pattern. The pixel values of the backgrounds 11-1 through 11-4 are b1, b2, b3, and b4, respectively.

Figure 3:
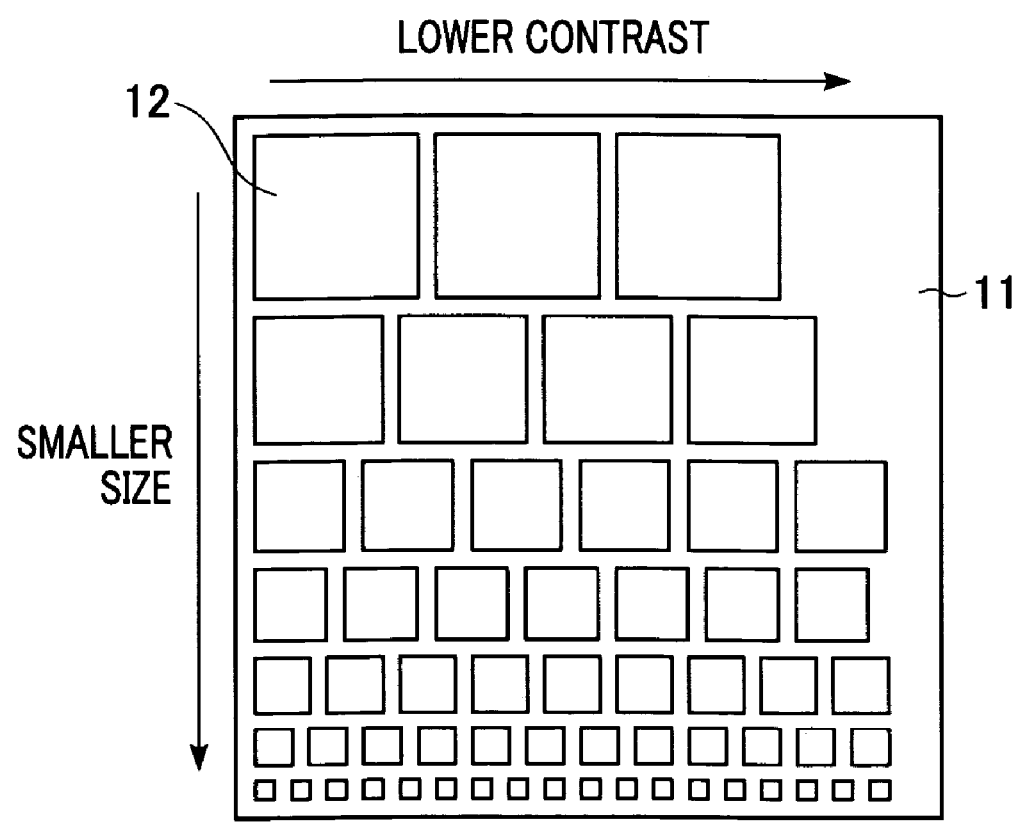
FIG. 3 illustrates the structure of one test pattern.
Figure 4:
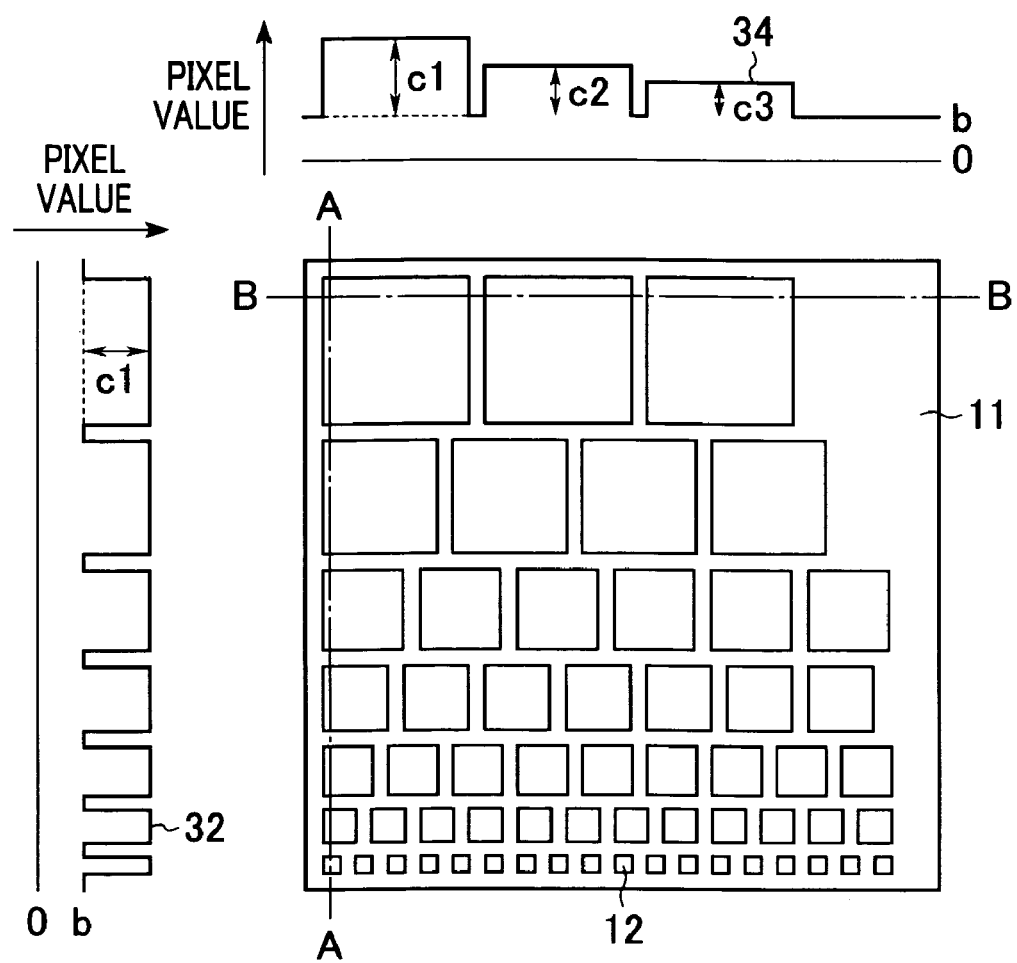
FIG. 4 is a diagram illustrating a pixel value in a particular contrast area of FIG. 3.

The structure of the test pattern is now described in detail with reference to FIGS. 3 and 4. FIG. 3 is a diagram illustrating the structure of one test pattern. As shown in FIG. 3, a plurality of contrast areas 12 can be contrasted with a background 11. Also, the relationship between size of a contrast area 12 and visibility can be examined by varying the size of the contrast area and the contrast value of the test pattern. FIG. 4 is a diagram illustrating a pixel value of a particular contrast area of FIG. 3.

As shown in FIG. 4, the higher the contrast area 12 is positioned, the larger the contrast area 12 becomes. The more left the contrast area 12 is positioned, the larger the contrast between the background and the pixel value becomes. A graph 32 shown in FIG. 4 plots the pixel value along a line A-A, and a graph 34 shown in FIG. 4 plots the pixel value along a line B-B. Here, b represents the pixel value of the background (background value), and c1, c2, and c3 represent pixel value differences between the contrast area and the background (hereinafter referred to as contrast values).

Figure 5:
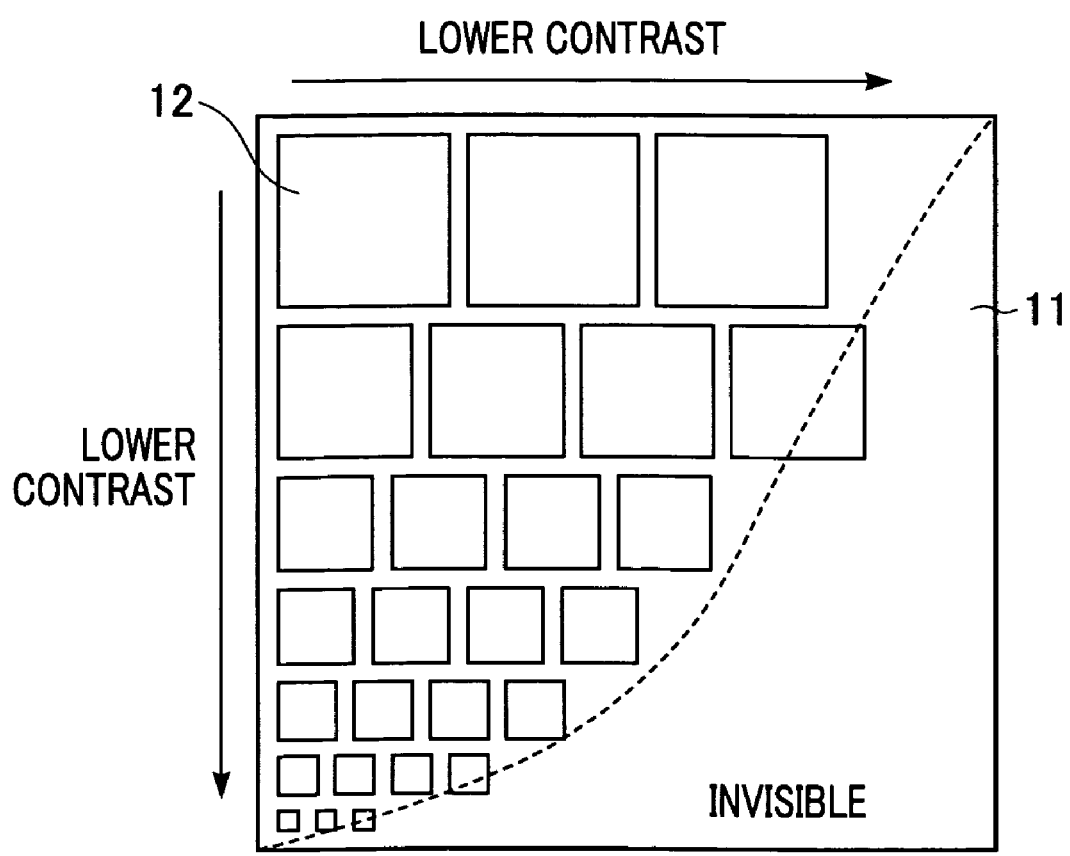
FIG. 5 is a diagram illustrating contrast and visibility features of a test pattern.

In this test pattern, the closer to the top-left corner the contrast area 12 is, the more visible the contrast area 12 is. For example, as shown in FIG. 5, while the contrast areas 12 closer to the top-left corner are visible, contrast areas 12 closer to the bottom-right corner of the pattern are invisible. As a result, the viewer sees a particular region as shown in FIG. 5. The way the test pattern looks is different depending on the contrast values c1, c2, and c3 if the shapes of the contrast areas 12 remain unchanged among the test patterns. FIG. 2 shows a plurality of arranged test patterns.

Figure 6:
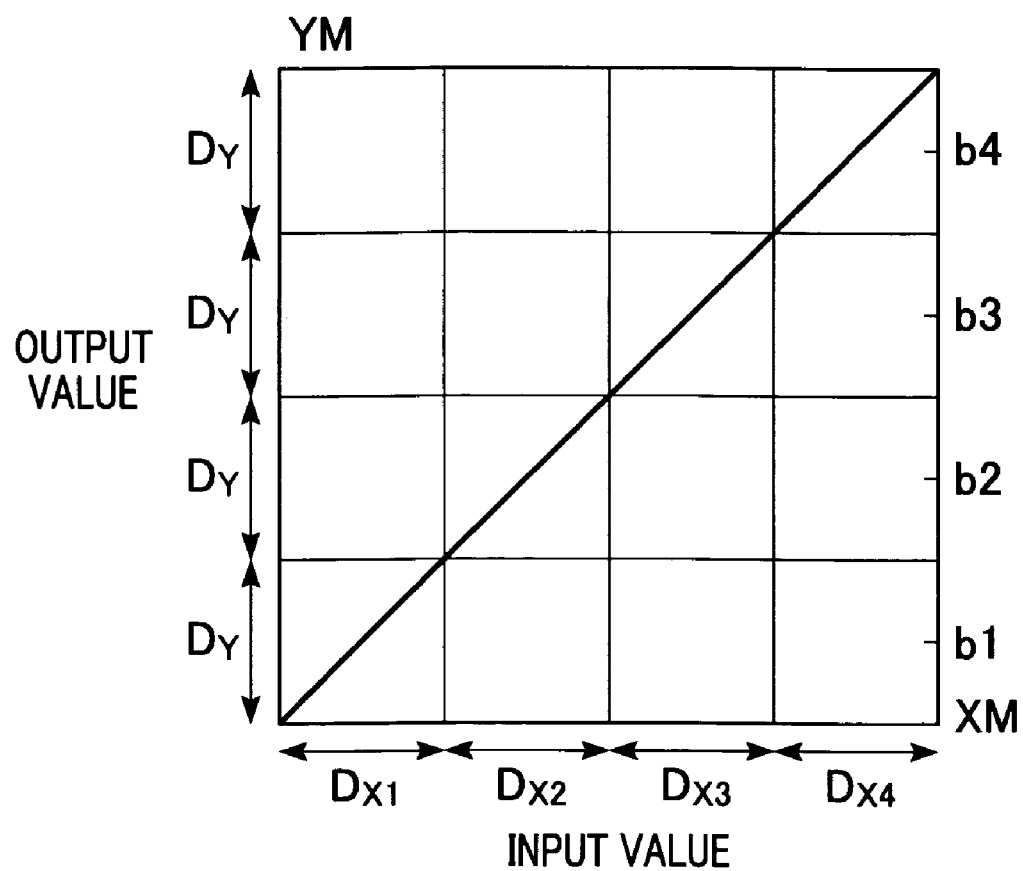
FIG. 6 is a graph plotting an initial state of an LUT.

In an initial state of an LUT, an input value and an output value are equal to each other as shown in FIG. 6. FIG. 6 plots the LUT. The abscissa represents the input value while the ordinate represents the output value. The input value ranges from zero to XM while the output ranges from zero to YM. The background values b1 through b4 are output values, and a range of zero to YM is divided into four equal segments.

FIGS. 7A-7D are graphs the test patterns 21 through 24 illustrated in FIG. 2. Each test pattern has values c1, c2, and c3, as shown. Each value is a pixel value for a particular contrast area along line B-B of FIG. 4, for example, as further illustrated by graph 34. As illustrated in FIGS. 7A-7D, the four test patterns 21 through 24 have different background values b1-b4, but have the same contrast values in the contrast areas positioned at the same locations.

A software program executed by the computer 3 will now be described. One purpose of the software program is to adjust the LUT 2 so that all test patterns appear at the same contrast to the operator.

Thus, the program executed by the computer 3 adjusts the LUT 2. In this program, the background value of the image seen by the operator is preferably free from variations. In the first embodiment, the image data of the test pattern is varied with the LUT 2 fixed. The operator views the image and then adjusts the LUT 2.

When one of the buttons 5 and 6 is selected with a cursor 7 placed in one of the test patterns 21 through 24, the program varies the contrast of the test pattern in response to the selected button. For example, the contrast of the test pattern with the cursor 7 placed thereon is multiplied by $\alpha 1$ if the button 5 is selected, or is multiplied by $\alpha 2$ if the button 6 is selected. Here, $\alpha 1$ is greater than 1, and $\alpha 2$ is greater than zero but smaller than 1.

To cause the test patterns to appear at the same contrast, the operator selects the button 5 if the test pattern is difficult to view with a low contrast, or the button 6 if the test pattern is too high in contrast in comparison with the other test patterns.

Figure 8:
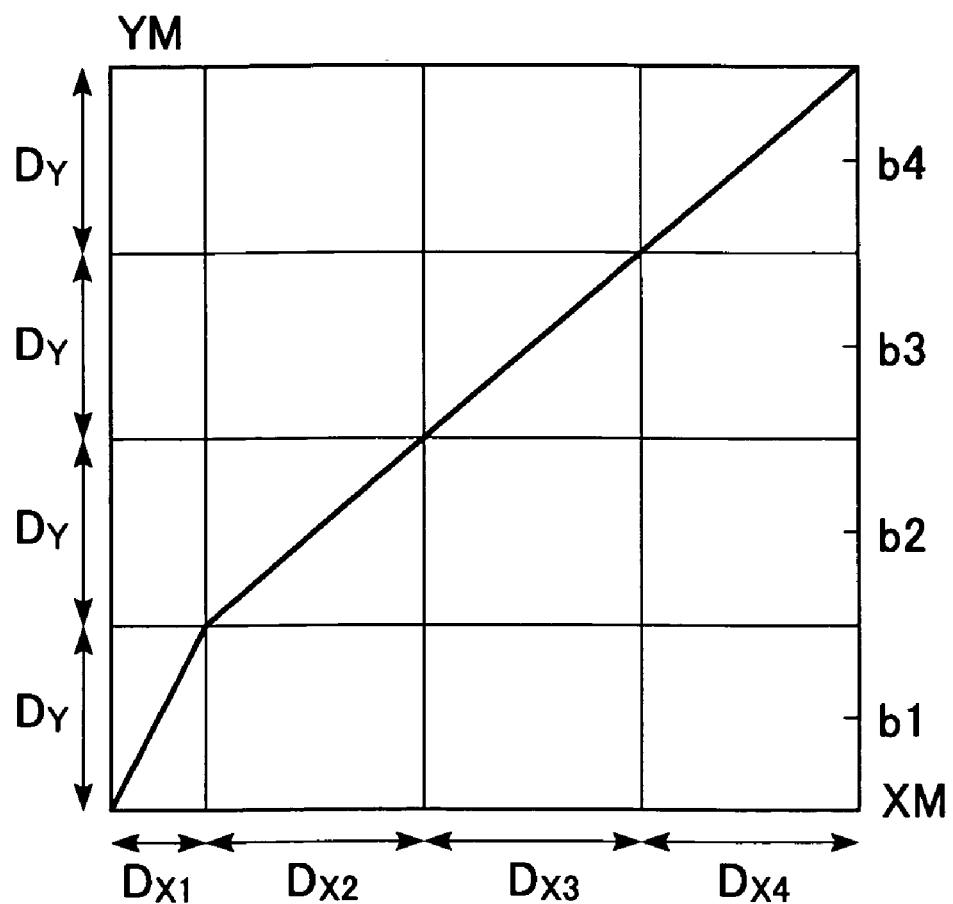
FIG. 8 is a graph illustrating a modification in the LUT of FIG. 1.
Figure 9A:
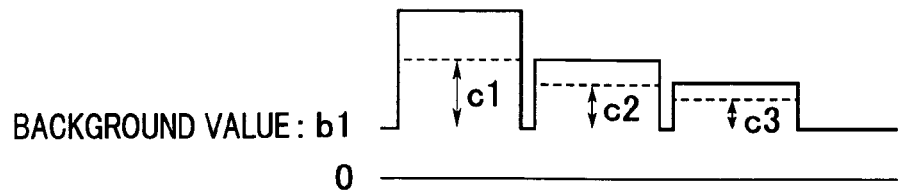
FIGS. 9A-9D are graphs illustrating changes in contrast values in response to modification of a gradient.
Figure 9B:
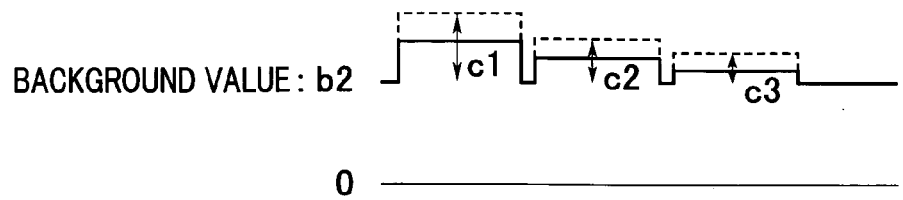
Figure 9C:
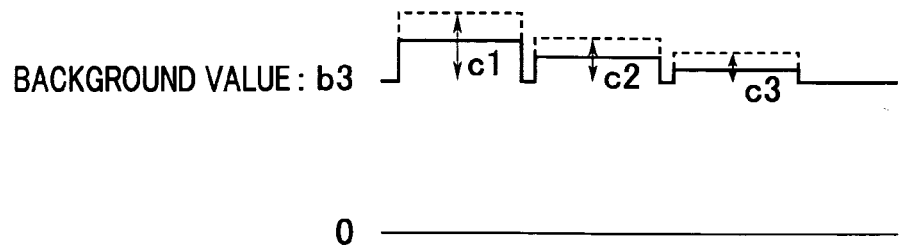
Figure 9D:
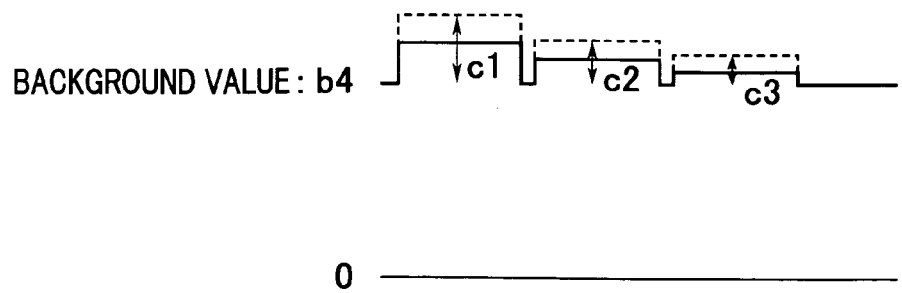

The operation of the buttons 5 and 6 varies gradient in each segment of the LUT 2. However, it may be difficult to vary independently the gradients of the test patterns 21 through 24. This is because the input value and the output value of the LUT 2 are limited in range. For example, let a1, a2, a3, and a4 represent the gradients of the test patterns 21 through 24, respectively, and if the gradient a1 is enlarged, the gradients a2, a3, and a4 naturally must become smaller as shown in FIG. 8. Since the range (luminance of background value seen by viewer) of the output value of LUT 2 is fixed, an input range segment per test pattern varies as shown in FIG. 8.

When the gradient of the LUT 2 in one test pattern is varied, the effect of the variation of the one test pattern on the other gradients is equally shared among the other test patterns. Let DX1 represent the range of the input value of the test pattern 21, DX2 represent the range of the input value of the test pattern 22, DX3 represent the range of the input value of the test pattern 23, DX4 represent the range of the input value of the test pattern 24, and DY represent the range of the output value of each test pattern, and the gradients a1, a2, a3, and a4 are expressed by equation 3.

$$a1 = \frac{D_Y}{D_{X1}}, \quad a2 = \frac{D_Y}{D_{X2}}, \quad a3 = \frac{D_Y}{D_{X3}}, \quad a4 = \frac{D_Y}{D_{X4}} \quad \text{[Equation 3]}$$

Equation 4 is derived from equation 3 based on DX1, DX2, DX3, and DX4.

$$XM = D_{X1} + D_{X2} + D_{X3} + D_{X4} \quad \text{[Equation 4]}$$

$$= D_Y \left( \frac{1}{a1} + \frac{1}{a2} + \frac{1}{a3} + \frac{1}{a4} \right)$$

The gradient a1 is now multiplied by k1. Here, k1 is $\alpha 1$ or $\alpha 2$. Let a1' represent a new gradient which is obtained when the gradient a1 is multiplied by k1, and the relationship of a1'=k1×a1 holds.

In the first embodiment, an error of the range of the input value occurring in the introduction of the gradient a1' is equally shared among the test patterns 22-24, and equation 4 still holds with the new gradients. The error $\Delta X$ occurring in the gradient a1' is expressed by equation 5.

$$\Delta_x = D_Y \left( \frac{1}{a1'} + \frac{1}{a2} + \frac{1}{a3} + \frac{1}{a4} \right) - \quad \text{[Equation 5]}$$

$$D_Y \left( \frac{1}{a1} + \frac{1}{a2} + \frac{1}{a3} + \frac{1}{a4} \right)$$

$$= D_Y \left( \frac{1}{a1'} - \frac{1}{a1} \right)$$

$$= \frac{D_Y}{a1} \left( \frac{1}{k1} - 1 \right)$$

The error $\Delta X$ is equally divided and shared by the three test patterns 22-24. New input ranges are determined, and new gradients a2', a3', and a4' are also determined. The new gradients are expressed by equations 6, 7, and 8, respectively.

$$a2' = \frac{D_Y}{D_{X2} - \Delta_X/3} \quad \text{[Equation 6]}$$

$$= \frac{D_Y}{D_{X2} - \frac{D_Y}{3 \cdot a1}\left(\frac{1}{k1} - 1\right)}$$

$$= \frac{1}{\frac{1}{a2} - \frac{1}{3 \cdot a1}\left(\frac{1}{k1} - 1\right)}$$

$$a3' = \frac{1}{\frac{1}{a3} - \frac{1}{3 \cdot a1}\left(\frac{1}{k1} - 1\right)} \quad \text{[Equation 7]}$$

$$a4' = \frac{1}{\frac{1}{a4} - \frac{1}{3 \cdot a1}\left(\frac{1}{k1} - 1\right)} \quad \text{[Equation 8]}$$

In practice, respective multipliers k2=a2'/a2, k3=a3'/a3, and k4=a4'/a4 of the gradients are used.

In response to the variation in the gradient a1, contrast values shown in FIGS. 7A-7D are changed from graphs represented by broken lines to graphs represented by solid lines in FIGS. 9A-9D. As shown in FIGS. 9A-9D, when the gradient a1 is enlarged, the contrast value increases in the test pattern 21 while the contrast values decreases in the other test patterns 22-24.

The operator here varies the gradient a1. Any of the other gradients a2, a3, and a4 may be varied as well. In such a case, the same calculations described in equations 6, 7, and 8 are carried out.

Figure 10:
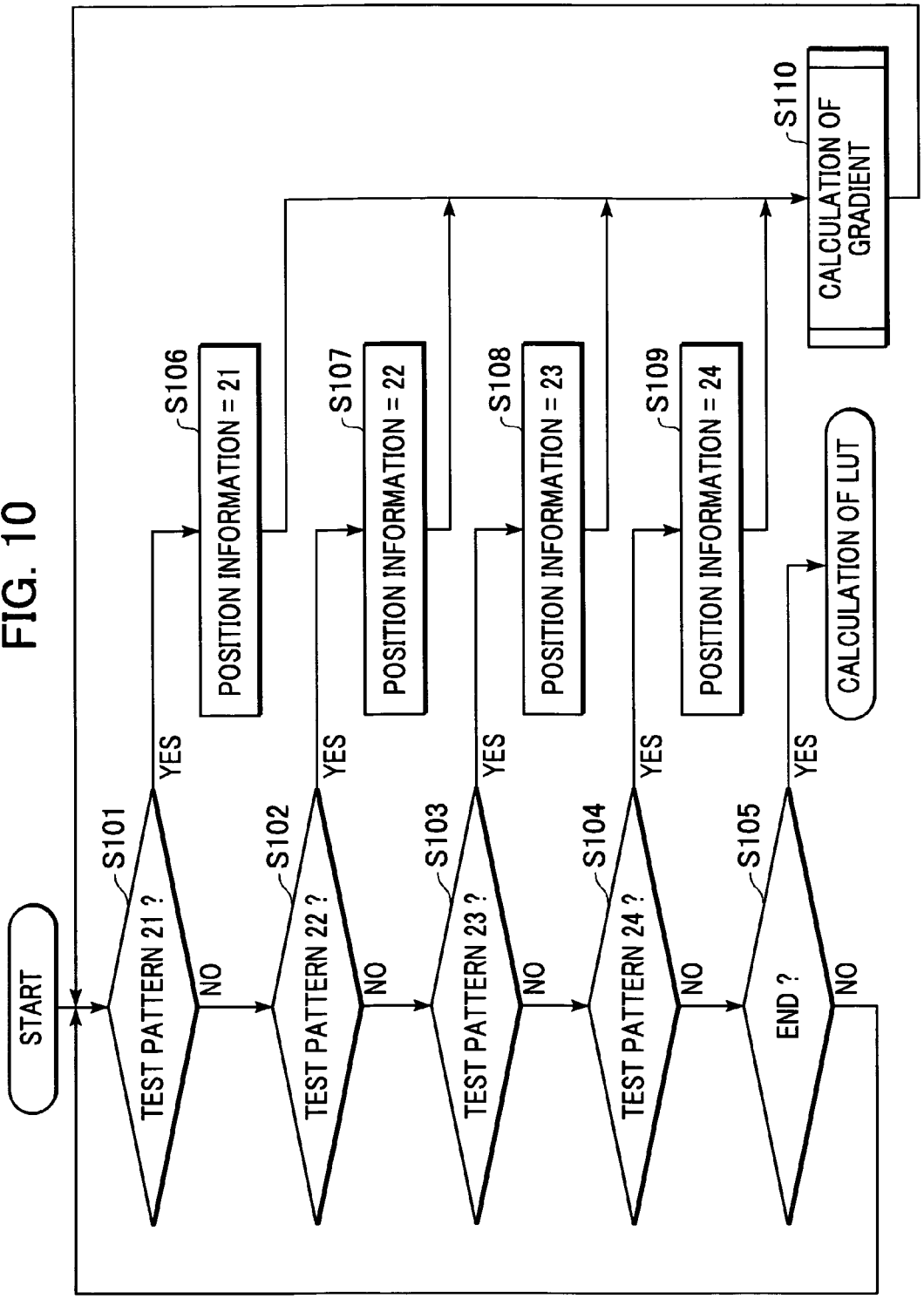
FIG. 10 is a flow diagram illustrating the content of a software program used in the first embodiment of the present invention.

The software program for the above-referenced operation will now be described in detail. FIG. 10 is a flow diagram of the software program used in the first embodiment.

First, at step S101, it is determined whether cursor 7 is positioned on test pattern 21 by using the input signal from the position indicator 4 (FIG. 1).

Otherwise, it is then determined in step S102 whether the cursor 7 is positioned on the test pattern 22. If not, it is then determined in step S103 whether the cursor 7 is positioned on the test pattern 23. If not, it is then determined in step S104 whether the cursor 7 is positioned on the test pattern 24.

If the cursor 7 is positioned on the test pattern 21, the "test pattern 21" is recorded as position information (step S106). A gradient calculation subroutine to be described later is performed in step S110.

If the cursor 7 is positioned on the test pattern 22, the "test pattern 22" is recorded as position information (step S107). A gradient calculation subroutine to be described later is performed in step S110.

If the cursor 7 is positioned on the test pattern 23, the "test pattern 23" is recorded as position information (step S108). A gradient calculation subroutine to be described later is performed in step S110.

If the cursor 7 is positioned on the test pattern 24, the "test pattern 24" is recorded as position information (step S109). A gradient calculation subroutine to be described later is performed in step S110.

An end process is performed if the operator is satisfied with the presented test pattern in step S105. Specifically, an end command may be entered using a key on the computer 3. When the end command is entered, the software program performs the LUT calculation to be described later.

Figure 11:
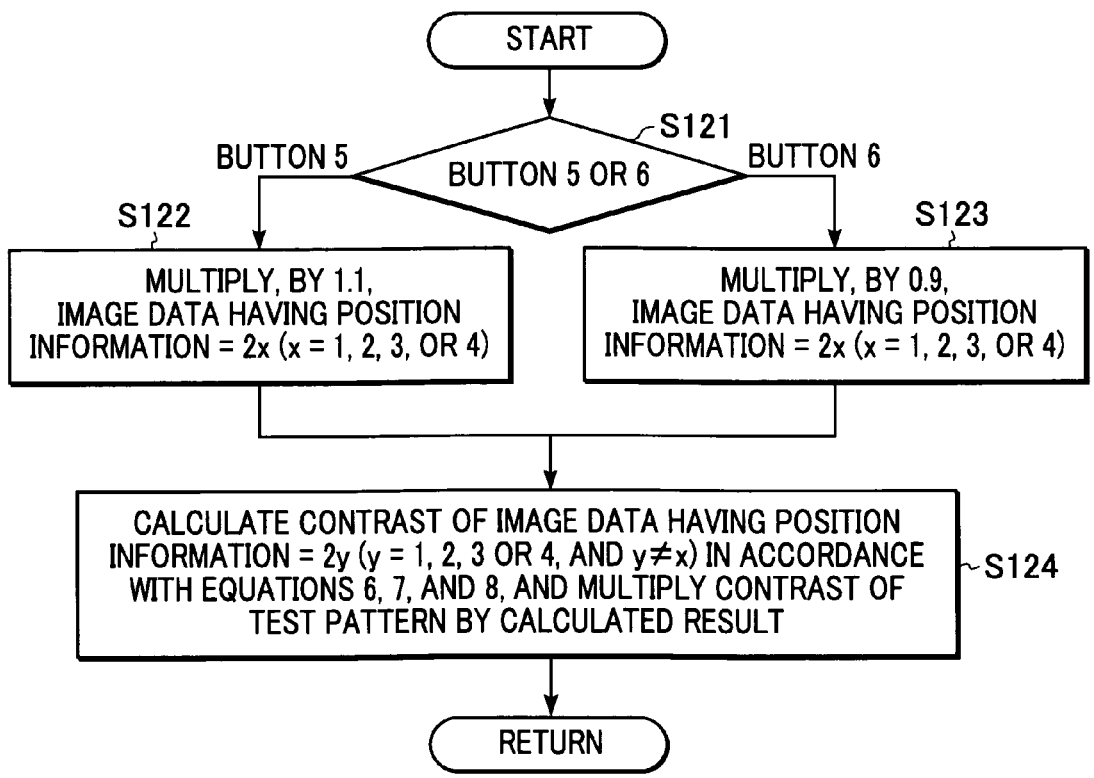
FIG. 11 is a flow diagram illustrating a gradient calculation subroutine in accordance with the first embodiment of the present invention.

FIG. 11 is a flow diagram illustrating a gradient calculation subroutine according to the first embodiment of the present invention (step S110 of FIG. 10).

As shown in FIG. 11, in step S121, the subroutine first determines which of the buttons 5 and 6 is selected.

The button 5 is now assumed to be selected. Selection of the button 5 means that the operator intends to increase the contrast. The contrasts of the contrast areas 11-x (x is one of integers 1-4) displayed in the test pattern 2x (x is one integers 1-4) stored as the position information are multiplied by 1.1 times ($\alpha$1) in step S122.

If the button 6 is selected, the operator intends to lower the contrast. The contrasts of the test pattern 2x (x is one of integers 1-4) stored as the position information are multiplied by 0.9 times ($\alpha$2) in step S123.

Here, a multiplication of 1.1 times and a multiplication of 0.9 times are only examples of $\alpha$1 and $\alpha$2, respectively, and $\alpha$1 and $\alpha$2 may take other values.

The contrasts of the test patterns, which are not directly varied by the operator, are varied in accordance with equations 6, 7, and 8. The image is thus repainted (step S124).

A series of these steps is repeated until the operator determines that all test patterns appear the same. When the algorithm ends after the operator determines that the test patterns are substantially identical to each other (step S105), the gradients a1 through a4 are determined.

Figure 12:
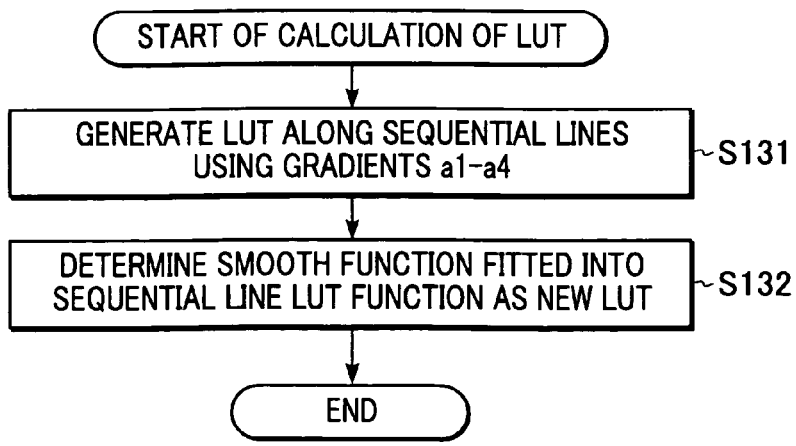
FIG. 12 is a flow diagram illustrating a method of correcting the LUT of FIG. 1.

The LUT 2 is modified based on the resulting gradients a1 through a4. FIG. 12 is a flow diagram illustrating a method of modifying the LUT 2.

Figure 13:
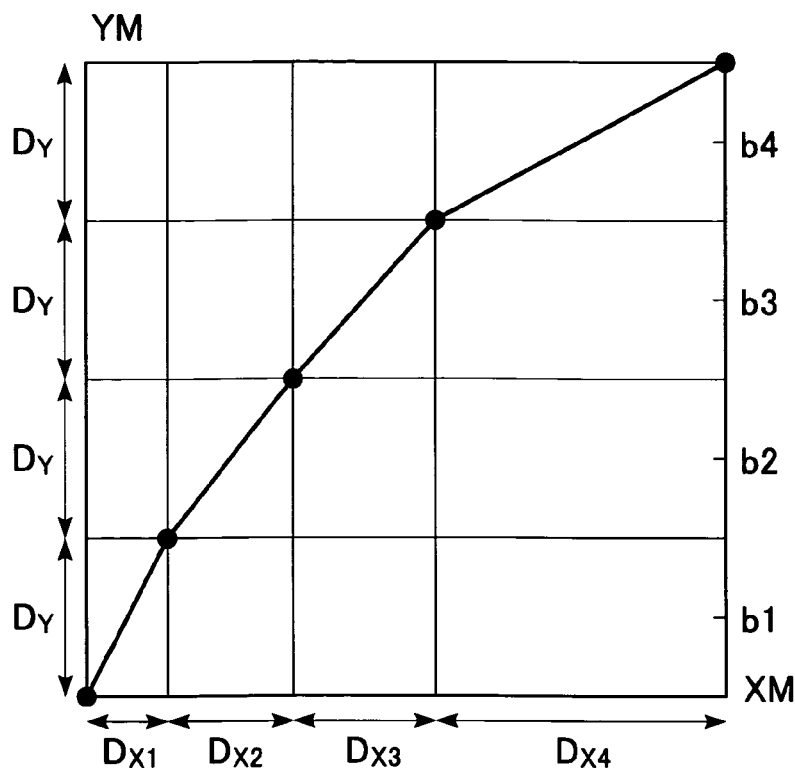
FIG. 13 is a graph illustrating the LUT adjusted using a sequential line graph.

In this modification method, a sequential line LUT shown in FIG. 13 is produced in accordance with the gradients a1-a4 of the test patterns 21-24 (step S131). DY remains constant among the test patterns, and Dx1 through Dx4 used here result from the gradients a1 through a4.

Figure 14:
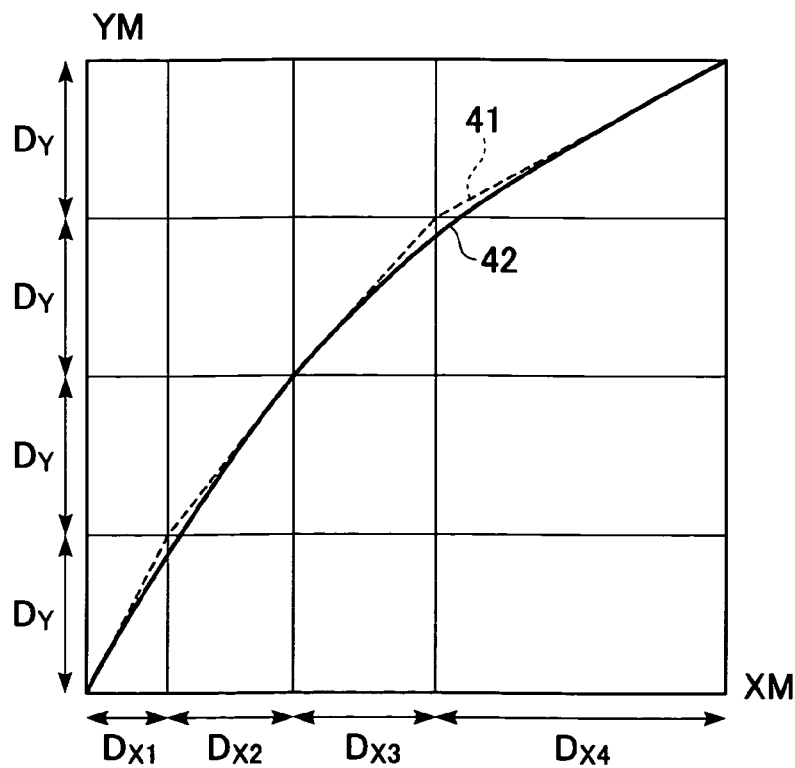
FIG. 14 is a graph, plotting a fitting process.

A practical and smooth curve fits with the sequential line LUT as shown in FIG. 14 (step S132). As a result, a smooth function 42 represented by the solid line fits with the sequential line function 41 represented by the broken lines.

The fitting process may be performed using any technique. For example, a technique for the fitting process may be approximating a predetermined polynomial using a least squares method, or determining parameters of a general non-linear function using a steepest gradient algorithm, or using a neural network which successively feeds back an error in an output and spreads the error by combining multiple sigmoid functions.

The LUT 2 modified and determined in this way is stored as a new LUT 2. Using the new LUT 2, tonal gradation characteristics best suited for the operator is thus obtained. In this case, a measurement apparatus, conventionally required to measure luminance characteristics of the display apparatus, is no longer required.

The shapes of the contrast areas are not limited to the ones shown. Any contrast area is acceptable as long as the contrast and size thereof are recognizable. For example, a chart is perfectly acceptable which includes a plurality of patterns, each having a different combination of spatial frequency and contrast.

Second Embodiment

A second embodiment of the present invention will now be described. In the first embodiment, the adjustment is made so that all test patterns appear the same. However, the appearance of the test pattern itself is also important. As shown in FIG. 5, for example, setting up a specification that the contrast areas 12 falling within a range from the top row to a predetermined row and from the leftmost column to a predetermined column must be visible is important to achieve stable image viewing.

It is not necessary cause all test patterns to appear the same. For example, as shown in FIG. 2, if the test patterns 22 and 23 at intermediate values are mainly used, the operator may set up an ending criterion for ending step S105 in FIG. 10 as being that the test patterns 22 and 23 appears as specified in the specification.

Third Embodiment

A third embodiment of the present invention will now be described. Since the contrast is adjusted with the background value remaining unchanged in the first embodiment, adjustment with the LUT being manipulated can be difficult.

The contrast is adjusted by shifting the LUT itself in accordance with the third embodiment. Although the output background value is constantly changing, it is not necessary to modify test image data.

When one of the buttons 5 and 6 is selected with the cursor 7 positioned on one of the test patterns 21-24, the contrast of that test pattern is varied in response to the selected button. If the button 5 is selected, the contrast of the test pattern with the cursor 7 positioned thereon is multiplied by $\alpha$1. If the button 6 is selected, the contrast of the test pattern is multiplied by $\alpha$2. Here, $\alpha$1 is larger than 1, and $\alpha$2 is larger than zero but smaller than 1.

Figure 15:
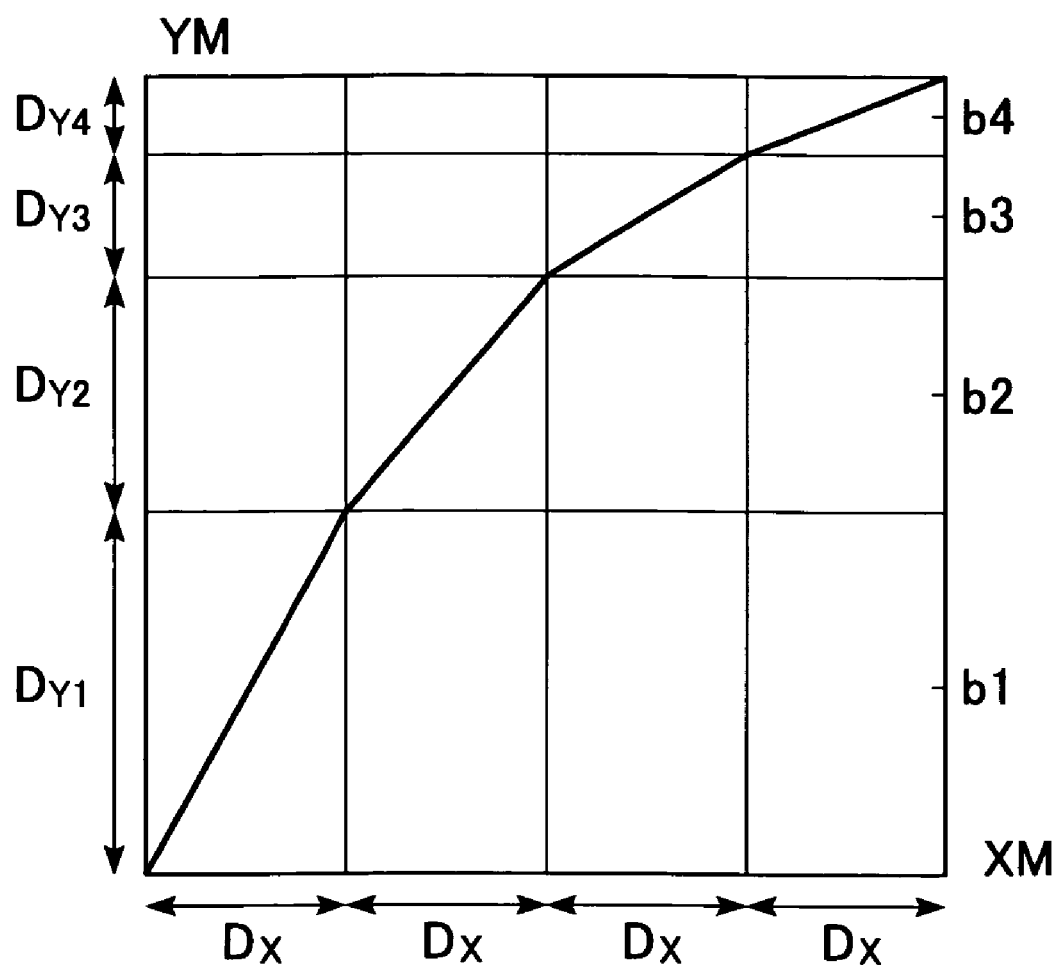
FIG. 15 is a graph, plotting the LUT resulting from a third embodiment of the present invention.

Unlike the first embodiment, the input range of the LUT 2 is fixed, and the range of the output value per test pattern is changed as shown in FIG. 15.

When the gradient of the LUT 2 in one test pattern is varied, the effect of the variation of the one test pattern on the other gradients is equally shared among the other test patterns in the third embodiment. Let DY1 represent the range of the output value of the test pattern 21, DY2 represent the range of the output value of the test pattern 22, DY3 represent the range of the output value of the test pattern 23, DY4 represent the range of the output value of the test pattern 24, and DX represent the range of the input value of each test pattern, and the gradients a1, a2, a3, and a4 are expressed by equation 9.

$$a1 = \frac{D_{Y1}}{D_X}, \quad a2 = \frac{D_{Y2}}{D_X}, \quad a3 = \frac{D_{Y3}}{D_X}, \quad a4 = \frac{D_{Y4}}{D_X} \qquad \text{[Equation 9]}$$

Equation 9 is different from equation 3 in that the input range DX per test pattern remains constant. Equation 10 is derived from the relationship of DY1, DY2, DY3, and DY4.

$$\begin{aligned} YM &= D_{Y1} + D_{Y2} + D_{Y3} + D_{Y4} \\ &= D_X(a1 + a2 + a3 + a4) \end{aligned} \qquad \text{[Equation 10]}$$

From equation 10, each of the gradients a1-a4 is not determined in a manner such that one gradient is independent of another. It is now assumed that the gradient a1 is multiplied by k1. Here, k1 is α1 or α2. Let a1' represent a new gradient that is obtained by multiplying a1 by k1, and the relationship a1'=k1×a1 holds.

In the third embodiment, an error in the output value range occurring during introduction of the gradient a1' is equally divided among the test patterns 22-24, and equation 10 still holds with the new gradients. The error ΔY occurring in the gradient a1' is expressed by equation 11.

$$\begin{aligned} \Delta_Y &= D_X(a1' + a2 + a3 + a4) - \\ & \quad D_X(a1 + a2 + a3 + a4) \\ &= D_X(a1' - a1) \\ &= D_X \cdot a1(k1 - 1) \end{aligned} \qquad \text{[Equation 11]}$$

The error ΔY is equally divided and shared by the three test patterns 22-24. New input ranges are determined, and new gradients a2', a3', and a4' are also determined. The new gradients are expressed by equations 12, 13 and 14, respectively.

$$\begin{aligned} a2' &= \frac{D_{Y2} - \Delta_Y/3}{D_X} \\ &= \frac{D_{Y2} - D_X \cdot a1(k1 - 1)/3}{D_X} \\ &= a2 - a1(k1 - 1)/3 \end{aligned} \qquad \text{[Equation 12]}$$

$$a3' = a3 - a1(k1-1)/3 \qquad \text{[Equation 13]}$$

$$a3' = a3 - a1(k1-1)/3 \qquad \text{[Equation 14]}$$

In practice, respective multipliers k2=a2'/a2, k3=a3'/a3, and k4=a4'/a4 of the gradients are used.

The operator here varies the gradient a1. Any of the other gradients a2, a3, and a4 may be varied as well. In such a case, the same calculations described in equations 12, 13, and 14 are carried out.

Figure 16:
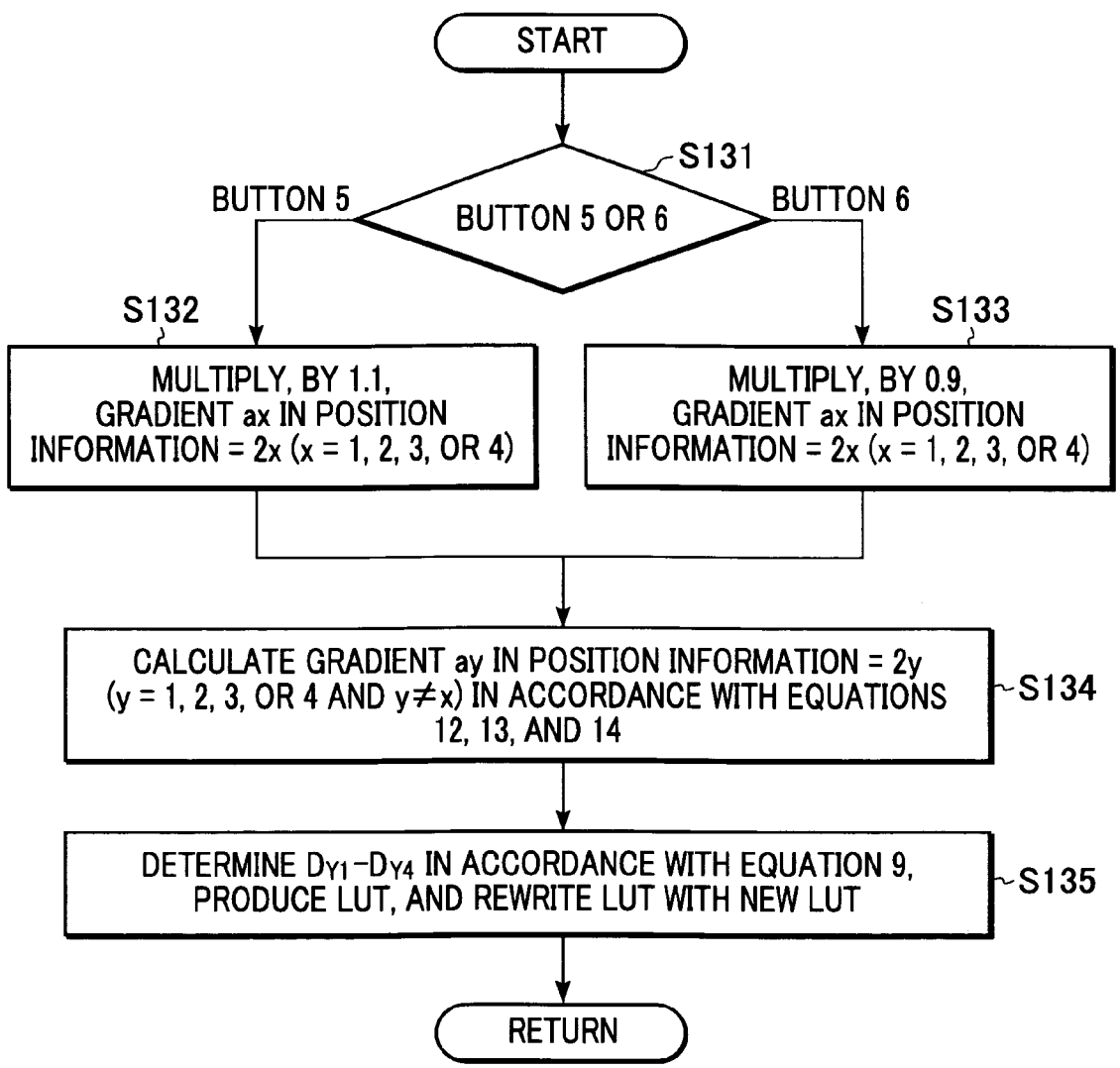
FIG. 16 is a flow diagram illustrating the gradient calculation subroutine in accordance with the third embodiment of the present invention.

The software program used in the third embodiment will be now described in detail. Note that the software programs of the third and first embodiments use different gradient calculation processes (gradient calculation subroutine). FIG. 16 is a flow diagram illustrating the gradient calculation subroutine of the third embodiment.

In the subroutine, it is determined in step 131 which of the buttons 5 and 6 is selected.

The button 5 is now assumed to be selected. Note that selection of button 5 means that the operator desires to heighten the contrast, a gradient ax of the test patterns 2x (x is one of integers 1-4) stored as the position information is multiplied by 1.1 times (α1) in step S132.

However, if the button 6 is selected, the operator intends to lower the contrast. The gradient ax of the test pattern 2x (x is one of integers 1-4) stored as the position information is multiplied by 0.9 times (α2) in step S133.

The gradients of the test patterns, which are not directly varied by the operator, are varied in accordance with equations 12, 13, and 14 (step S134). The range of the output signal is adjusted based on equation 9 to produce a new LUT 2. An existing LUT 2 is overwritten by the new LUT 2 (step S135), and the image is thus repainted.

A series of these steps is repeated until the operator determines that all test patterns appear substantially the same. Next, in step S105, the algorithm is ended, and the gradients a1 through a4 are determined. A sequential line LUT shown in FIG. 15 is achieved. The fitting process is also performed in the same manner as in the first embodiment.

Like the first embodiment, the third embodiment provides tonal gradation characteristics best suited for the operator. Since the third embodiment eliminates the need for repainting the image, an ordinary image may be used as a test pattern.

Fourth Embodiment

Figure 17:
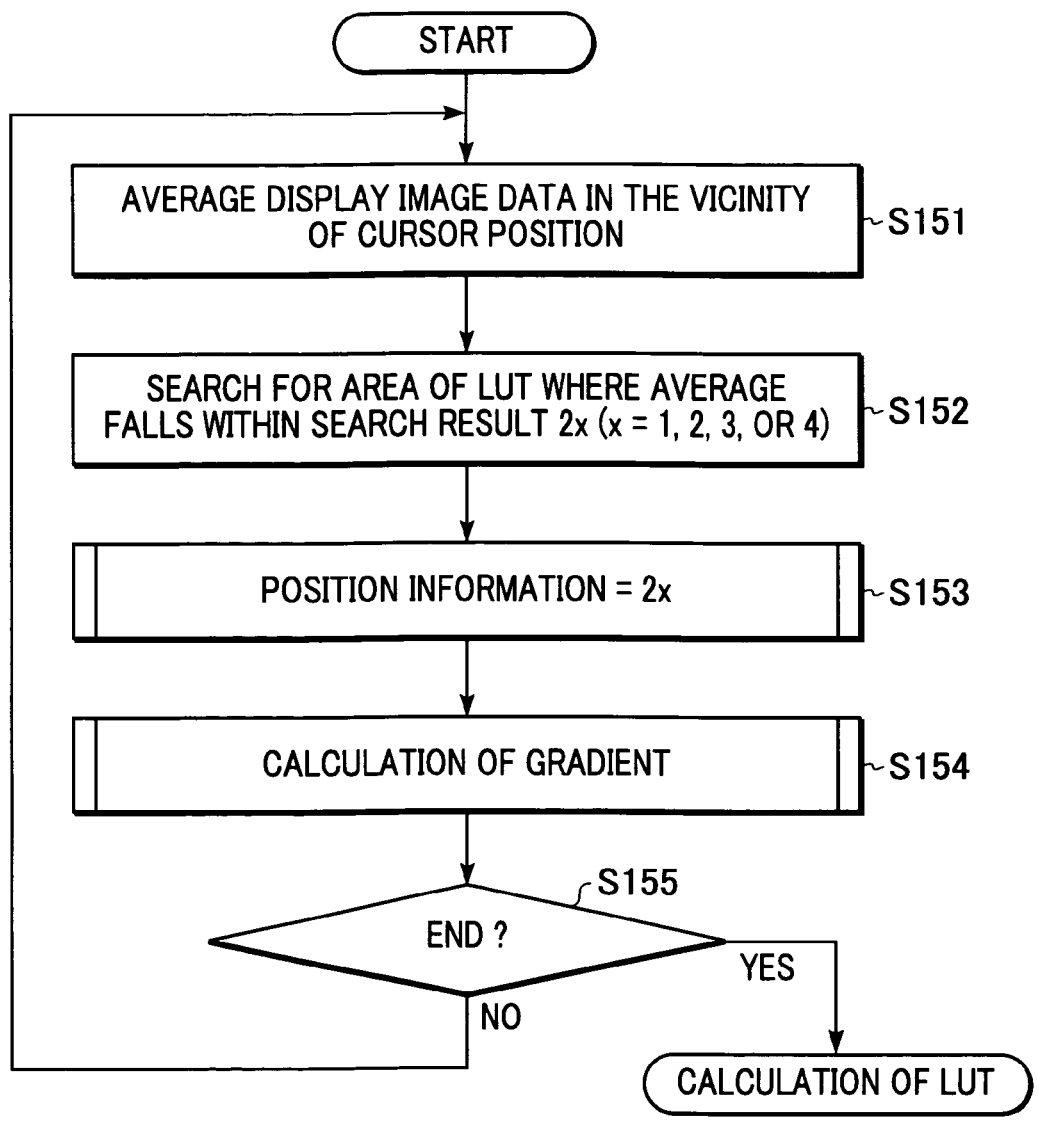
FIG. 17 is a flow diagram illustrating the content of a program used in accordance with a fourth embodiment of the present invention.
Figure 18:
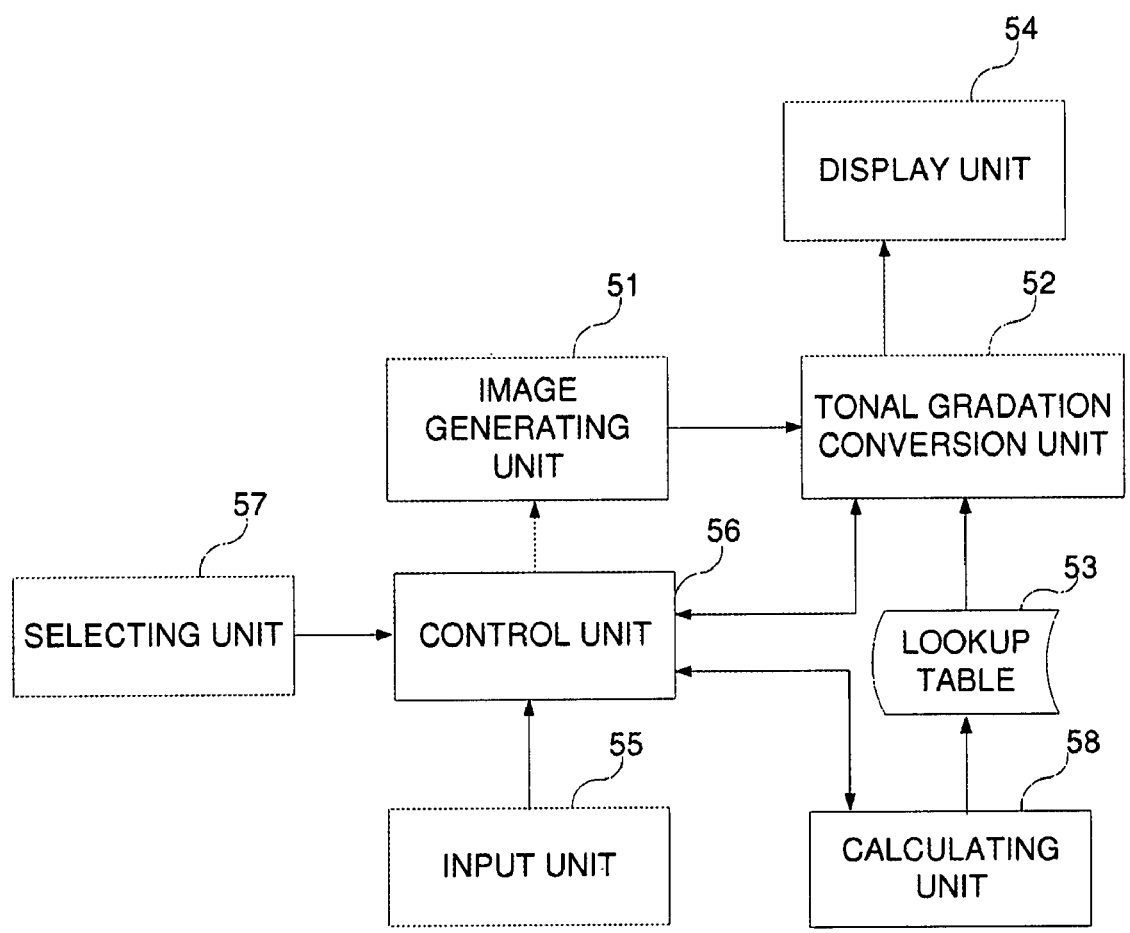
FIG. 18 is a diagram illustrating an embodiment of an apparatus for processing an image in accordance with the present invention.

A fourth embodiment will now be described. The fourth embodiment uses a natural image, such as a radiological image, rather than an artificial image such as the test pattern used in the third embodiment. FIG. 17 is a flow diagram illustrating the content of a software program used in the fourth embodiment.

The operator presses button 5 or button 6 while pointing to a location on the display screen where the user desires to heighten or lower contrast.

In response, the mean of the pixel values at the pointed location and in a peripheral region surrounding the pointed location is calculated in step S151. The peripheral region is an area of 100 pixels by 100 pixels centered on the pointed location on the screen.

In step S152, the mean of the pixel values is used to determine in which of the four input ranges (four DXs) of the test pattern the mean falls.

Information representing the input range per test pattern is stored as position information of the test pattern (step S153). The gradient calculation subroutine is executed as illustrated in the flow diagram in FIG. 16.

In accordance with the fourth embodiment, the operator views an actual image at a desired tonal gradation by repeating the above series of steps.

The functions of the above preferred embodiments of the present invention are carried out by the computer (image processing apparatus) 3 that controls the units of the image display apparatus by executing the programs. Such programs and means for supplying the computer with the programs, such as a computer readable recording medium, such as a CD-ROM for storing the programs, and a transmission medium such as the Internet for transmitting the programs are included in the preferred embodiments of the present invention. The programs, the recording medium, the transmission medium, and program product fall within the scope of the present invention.

Thus, according to one aspect, the present invention thus sets the tonal gradation characteristics on the image displayed on the display apparatus depending on the vision characteristics of the viewer.

Other Embodiments

The object of the present invention can also be achieved by supplying a storage medium for storing program code for implementing the functions of the first or second embodiment for execution by computer (CPU, MPU, etc.).

In that case, the program code itself, read from the storage medium, achieves the functions of the first or second embodiment, and thus the storage medium storing the program code and the program code itself constitute the present invention.

The storage medium for providing the program code may be, for example, a ROM, a floppy (registered trademark) disk, a hard disk, an optical disk, a magneto-optical disk, a CD-ROM, a CD-R, a magnetic tape, a non-volatile memory card, etc.

Furthermore, not only by the computer reading and executing the program code, but also by the computer executing part of or the entire process utilizing an OS, etc. running on the computer based on instructions of the program code, the functions of the first or second embodiment may be achieved. The latter is also one of embodiments of the present invention.

Furthermore, the program code read from the storage medium may be written to a memory of a function extension board inserted in the computer or a function extension unit connected to the computer. The functions of the first or second embodiment may be realized by executing part of or the entire process by a CPU, etc. of the function extension board or the function extension unit based on instructions of the program code. This is also one of embodiments of the present invention.

When the present invention is applied to a program or a storage medium storing the program, the program includes, for example, program code corresponding to at least one of the flowcharts shown in FIGS. 10, 11, 12, 16 and 17 explained above.

It is to be understood that the present invention may also be applied to an multi-system that may include a plurality of systems such as a radiation generating apparatus, a radiographic apparatus, image processing apparatus, and an interface apparatus, for example. It is equally applicable to a single integrated system in which functions of these apparatuses are integrated. When the present invention is applied to a multi-system, the systems communicate with one another via, for example, electrical, optical, and/or mechanical means, and/or the like.

Furthermore, the present invention may also be applied to an image diagnosis aiding system including a network (LAN and/or WAN. etc.).

The present invention thus achieves the above-described object as described above.

The present invention is not limited to the above embodiments and various changes and modifications can be made within the spirit and scope of the present invention. Therefore to apprise the public of the scope of the present invention, the following claims are made.

What is claimed is:

1. A method for processing images to adjust for tonal degradation characteristics for a display device, the method comprising:
   receiving a plurality of test pattern images;
   varying a gradient of one of the plurality of test pattern images to adjust its contrast;
   automatically varying gradients of other non-selected test pattern images to adjust their contrasts, wherein said variation of gradients is equally shared among the non-selected test pattern images;
   repeating the varying and automatic varying steps until all test pattern images meet a predefined criteria; and
   generating a LUT (look-up table) associated with the plurality of test pattern images based on determined variation in gradients.

2. The method of claim 1 wherein the predefined criteria is that all the test pattern images look alike to an operator.

3. The method of claim 1 wherein the predefined criteria is that selected contrast areas of the test pattern images are visible.

4. The method of claim 1 wherein the test pattern images include background and contrast areas.

5. The method of claim 4 wherein the step of generating a LUT further comprises using pixel values of the background area of the selected pattern image and the contrast area of the selected pattern image.

6. The method of claim 4 further comprising adjusting the contrast areas in contrast with fixed pixel values of the background areas until the test patterns look the same.

* * * * *